March 2, 1954     E. SCHLUETER     2,670,513
SELF-LOCKING SPRING ARM FASTENING DEVICE
Filed Nov. 19, 1948
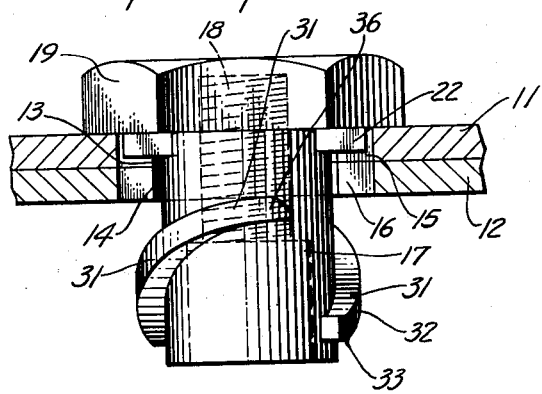
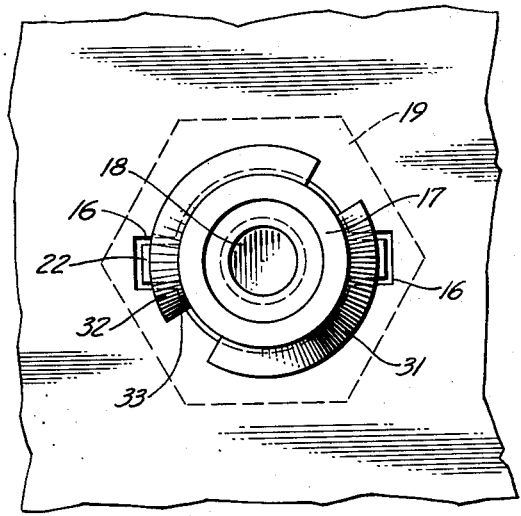
INVENTOR.
ERNEST SCHLUETER
BY
ATTORNEY.

Patented Mar. 2, 1954

2,670,513

UNITED STATES PATENT OFFICE 2,670,513

SELF-LOCKING SPRING ARM FASTENING DEVICE

Ernest Schlueter, Troy, N. Y., assignor to Simmons Fastener Corporation, Albany, N. Y., a corporation of New York Application November 19, 1948, Serial No. 61,010

2 Claims. (Cl. 24—221)

1

This invention relates to methods of making holding or fastening devices adapted to be secured to a plate structure or to secure together two or more superposed plates or other members and relates more particularly to devices similar to the fastener devices in my application Serial Number 571,412, filed January 5, 1945.

In my said application are shown fastening devices for fastening together superposed outer and inner plate members having coaxial holes having opposite marginal notches. A stud rotatably disposable in said holes is provided at the outer end with a tool-receiving head engageable with the outer face of the outer member, the inner end portion of the stud having arms thereon disposed at opposite sides of the stud and extended toward said head and adapted, on rotation of the stud in said openings, to yieldably cam from the notches of the inner member to an exposed engagement face of the inner member between the notches, to hold the stud in place and the members together, the arms being adapted on further rotation of the stud to pass into the notches and release the stud.

Objects of the invention are to provide an improved method of making a one-piece fastening device and an improved self-fastening nut such as an anchor nut.

The inventive features for accomplishing this method are described in connection with a one-piece internally threaded headed stud member or nut formed with spiral arms joining the member remote from its head and extending nearly to the head.

In the accompanying drawing,

Fig. 1 is a side elevation, partly in section, showing the holding device securing together a pair of superposed plates and having a threaded bore adapted to adjustably receive a threaded member;

Fig. 2 is a bottom plan of the device of Fig. 1.

My improved fastening device or anchor nut is shown securing together superposed outer and inner plate members 11 and 12 having partially round coaxial registering holes 13 and 14 therein, the holes having diametrically opposite notches 15, 16, the notches of one plate registering with the notches of the other plate.

The fastening device or anchor nut comprises a tubular stud member or nut 17 rotatably disposed in said holes 13, 14 and having internal threads 18 and an outer angular tool-receiving head 19 provided with lugs 22 adjacent to the stud member or nut adapted to engage in the notches 15 of the outer plate.

2

The outer side face of the end of the stud member or nut most remote from the plates is formed with opposite peripheral ribs 32 of substantially square cross section having their inner end portions 33 integral with the stud member at respectively diametrically opposite portions of the stud member, said ribs except at the integral end portions being forced toward the head and permanently disposed spirally around the shank as shown in Fig. 1 to provide locking arms 31, each arm having a free end provided with a rounded cam face 36 engageable with the exposed face of the inner plate between the notches.

When the parts are to be assembled the stud member is passed into the hole 13 in the outer plate member only and rotated forwardly by engagement of a tool with the head 19; and said arms 31 pass into the notches 15 and cam against the edges of the notches at inner face of the outer plate 15 and automatically bring the arm ends 36 against the inner face of the outer plate 11 between the notches thereof, thus bringing the stud in position to be passed into the hole 14 in the inner plate member 12 with the arms passing through the notches 16 thereof. Further rotation of the stud causes the arms to cam through the notches 16 onto the exposed face of the inner plate member 12, causing arm ends 36 to engage the exposed face of the inner plate member 12 between the notches 16 to hold the members and stud in place as in Fig. 1. A quarter turn further rotation of the stud brings the arm ends 36 to the notches 16 of the inner member thus unlocking them and the stud from the inner plate member. Still further rotation will bring the arms to the notches 15 and release the stud from the outer member.

My anchor nut or fastening device is particularly suitable for securing together or to be secured to a structure such as one or two or more superposed sheets or plates such as the plate members 11, 12 and to receive in the tubular stud member a headed anchor bolt for detachably securing to said structure a detachable additional outer plate or part having a hole for receiving said bolt, whereby the head of the bolt may engage the outer face of said outer plate and hold the outer plate firmly against the head of said anchor nut, allowing said outer plate to be readily removed by removing said bolt while the anchor nut is held in or holds together the superposed plates of the structure.

The method for making the holding device adapted to be secured on a plate structure having a partially round hole therethrough having opposite notches therein will be understood from the foregoing and is now briefly summarized as follows:

First there is formed an internally threaded tubular shank having an outer angular tool receiving head and lugs adjacent to the head, peripheral ribs of substantially square cross section being formed on the inner end of the outer face of the shank having at least the inner end portions integral with the shank respectively at diametrically opposite portions of the shank. Then said ribs, except at said inner end portions are forced toward the head and spirally around the shank to provide locking arms.

I claim as my invention:

1. A method comprising forming a cylindrical shank having an outer head, and peripheral ribs on the inner end of the outer face of the shank having end portions integral with the shank at diametrically opposite portions of the shank; and forcing said ribs except at said end portions, toward the head and spirally around the shank to provide locking arms having engagement ends.

2. A method for making a holding device adapted to be secured on a plate structure having a partially round hole therethrough having opposite notches therein; said method comprising forming an internally threaded tubular shank rotatably disposable in said hole and having an outer angular tool receiving head, lugs adjacent to the head adapted to engage in said notches, and partly circumferential peripheral ribs of substantially square cross section on the inner end of the outer face of the shank having inner end portions integral with the shank respectively at diametrically opposite portions of the shank; and forcing said ribs except at said inner end portions, toward the head and spirally around the shank to provide locking arms having engagement ends engageable with the exposed inner face of said structure between the notches.

ERNEST SCHLUETER.

References Cited in the file of this patent

UNITED STATES PATENTS

| Number | Name | Date |
|---|---|---|
| 1,064,897 | Gabet | June 17, 1913 |
| 1,965,520 | Boden | July 3, 1934 |
| 2,045,327 | Laemmel | June 23, 1936 |
| 2,080,769 | Fitts | May 18, 1937 |
| 2,110,434 | Albin | Mar. 8, 1938 |
| 2,110,435 | Albin | Mar. 8, 1938 |
| 2,128,005 | Lombard | Aug. 23, 1938 |
| 2,160,298 | Weber | May 30, 1939 |
| 2,179,604 | Tinnerman | Nov. 14, 1939 |
| 2,262,418 | Zahodiakin | Nov. 11, 1941 |
| 2,340,250 | Murphy | Jan. 25, 1944 |
| 2,345,004 | Place | Mar. 28, 1944 |
| 2,373,722 | Von Opel | Apr. 17, 1945 |
| 2,608,735 | Poupitch | Sept. 2, 1952 |